US007828034B2

(12) United States Patent
Morning

(10) Patent No.: US 7,828,034 B2
(45) Date of Patent: Nov. 9, 2010

(54) TEMPORARY PLAQUE MANUFACTURING APPARATUS

(76) Inventor: Daniel Morning, Listillion, Letterkenny, County Donegal (IE)

( * ) Notice: Subject to any disclaimer, the term of this patent is extended or adjusted under 35 U.S.C. 154(b) by 304 days.

(21) Appl. No.: 12/176,609

(22) Filed: Jul. 21, 2008

(65) Prior Publication Data

US 2010/0011633 A1 Jan. 21, 2010

(51) Int. Cl.
*B32B 37/00* (2006.01)

(52) U.S. Cl. ........................ 156/555; 156/580; 156/581

(58) Field of Classification Search ................. 156/555, 156/574, 580, 581, 583.1
See application file for complete search history.

(56) References Cited

U.S. PATENT DOCUMENTS 4,940,506 A * 7/1990 Krause ....................... 156/584
6,457,507 B1 * 10/2002 Kubota ....................... 156/584
2001/0007620 A1 * 7/2001 Edenlund et al. ......... 400/615.2

FOREIGN PATENT DOCUMENTS

EP 1437234 A1 * 7/2004

* cited by examiner

*Primary Examiner*—James Sells
(74) *Attorney, Agent, or Firm*—K&L Gates LLP

(57) ABSTRACT

This invention relates to a temporary plaque manufacturing apparatus of the type comprising a plaque support frame having a pair of substantially parallel slots, one of which is a plaque receiving slot and the other is a flexible sheet receiving slot. The plaque receiving slot has a plaque support surface and an elongate flap housed therein and located on opposite sides thereof. Biasing means are provided to urge the flap towards the plaque supporting surface. A temporary plaque comprising a two part plaque, one part being a mounting plate and the other part being a flexible sheet, is inserted through the plaque receiving slot to affix the flexible sheet to the mounting plate. The elongate flaps are provided with wear resistant covers, preferably of a reinforced vinyl material that extend upwardly along the forward face of the elongate flaps.

20 Claims, 6 Drawing Sheets

TEMPORARY PLAQUE MANUFACTURING APPARATUS

FIELD OF THE INVENTION

This invention relates to a temporary plaque manufacturing apparatus and more specifically to improvements to the temporary plaque manufacturing apparatus described in the applicant's own granted European Patent No. EP 1,437,234.

BACKGROUND OF THE INVENTION

Until recently, plaque manufacture was often considered a time consuming and expensive process. In circumstances where the plaque was used for a very limited period of time, such as a plaque mounted on a coffin, the cost of producing an engraved plaque often seemed disproportionate to the benefit derived from having the engraved plaque. In order to overcome the problems with plaque manufacture, the applicant devised a temporary plaque manufacturing apparatus and a method of manufacturing a temporary plaque. The temporary plaque manufacturing apparatus and method of using same are described in detail in the applicant's European Patent number EP 1,437,234, the entire disclosure of which is incorporated herein by way of reference.

EP 1,437,234 describes a method of printing indicia onto a flexible sheet having an adhesive coating on one side of the sheet and thereafter fixing that flexible sheet onto a mounting plate. The mounting plate and flexible sheet, together comprising a temporary plaque, could then be mounted on a coffin or other object in need of a temporary plaque. The apparatus described in EP 1,437,234 was found to produce a particularly aesthetically pleasing temporary plaque in a relatively inexpensive, simple and efficient manner. Furthermore, the temporary plaques manufactured using the method and apparatus described in EP 1,437,234 are perceived as being of high quality and comparable to a plaque that has been engraved.

There is, however, a problem with the temporary plaque manufacturing apparatus described in EP 1,437,234. Specifically, the resiliently deformable flaps 11, 13 have been found to wear down over time thereby reducing the effectiveness of the temporary plaque manufacturing apparatus and reducing the quality of the plaques manufactured thereby. This problem has been found to be particularly acute when different sized plaques are used in the apparatus. Many of the mounting plates will have a raised lip around the periphery of the mounting plate and for smaller mounting plates that do not extend across the entire width of the flap, the raised rim has been found to wear a grove in the flap. Over time, this grove can inhibit the smoothing of the flexible sheet onto the mounting plate thereby adversely affecting the aesthetic appearance of the temporary plaque.

It has been found that a worn flap can cause scores or scratches on the face of the completed plate. In some cases, a worn flap has been found to leave unacceptable air bubbles trapped between the vinyl sheet and the plate due to the fact that the flap is not engaging the plaque in the worn areas. These defects effectively render the temporary plaque useless and results in a waste of time and resources.

It is an object therefore of the present invention to overcome the problem with the known temporary plaque manufacturing apparatus.

SUMMARY OF THE INVENTION

This invention relates to a temporary plaque manufacturing apparatus, the temporary plaque comprising a two part plaque, one part being a mounting plate and the other part being a flexible sheet, the flexible sheet having indicia on a first surface thereof and an adhesive coating on a second surface thereof for affixing the flexible sheet onto a front face of the mounting plate, the temporary plaque manufacturing apparatus comprising a plaque support frame having a plaque receiving slot and a flexible sheet receiving slot, the flexible sheet receiving slot being dimensioned to receive a free end of the flexible sheet and gradually release the flexible sheet therefrom as the flexible sheet and the mounting plate are passed through the plaque receiving slot;

the plaque receiving slot having a plaque support surface and an elongate flap housed therein and located on opposite sides thereof, the plaque receiving slot further comprising a biasing means urging the flap towards the plaque support surface, the plaque support surface being for engagement of one of the mounting plate and the flexible sheet and the elongate flap being for engagement of the other of the mounting plate and the flexible sheet so that on the mounting plate and the flexible sheet being passed between the plaque support surface and the elongate flap, the flexible sheet is brought into engagement with the mounting plate and secured thereto;

the elongate flap further comprising a first elongate edge about which the flap is mounted on the plaque support frame and a second elongate edge located adjacent to the plaque support surface, the elongate flap having a wear resistant cover mounted thereon, the wear resistant cover extending upwardly along a forward facing surface of the elongate flap, over the edge located adjacent to the plaque support surface and downwardly along a rearward facing surface of the elongate flap.

By having such a temporary plaque manufacturing apparatus, the apparatus will continue to produce high quality temporary plaques over a significantly longer period of time than was heretofore the case and prevent the undesirable attributes caused by wear on the flap. Furthermore, the amount of maintenance and repair required is reduced significantly.

In one embodiment of the invention, the wear resistant cover extends upwardly along the forward facing surface of the elongate flap by a distance no less than 0.005 meters.

In one embodiment of the invention, the wear resistant cover extends downwardly along a rearward facing surface of the elongate flap by a distance no less than 0.005 meters.

In one embodiment of the invention, the wear resistant cover comprises a reinforced vinyl material. It is envisaged that the wear resistant cover comprises polyester vinyl. Polyester vinyl has been found to be particularly useful as it will not damage the flexible sheet or the mounting plate and can be applied quickly and easily to the elongate flap.

In one embodiment of the invention, the wear resistant cover extends across the temporary plaque manufacturing apparatus along the entire length of the elongate flap.

In one embodiment of the invention, there are provided a plurality of wear resistant covers mounted in layers, one on top of the other, on the elongate flap.

In one embodiment of the invention, there is provided a mounting plate which is deformable and may be bent intermediate its ends to a maximum depth of curvature of the order of at least 20% of the length of the mounting plate. Preferably, the mounting plate has a maximum thickness of between 0.001 meters and 0.002 meters.

DETAILED DESCRIPTION OF THE DRAWINGS

Figure 1:
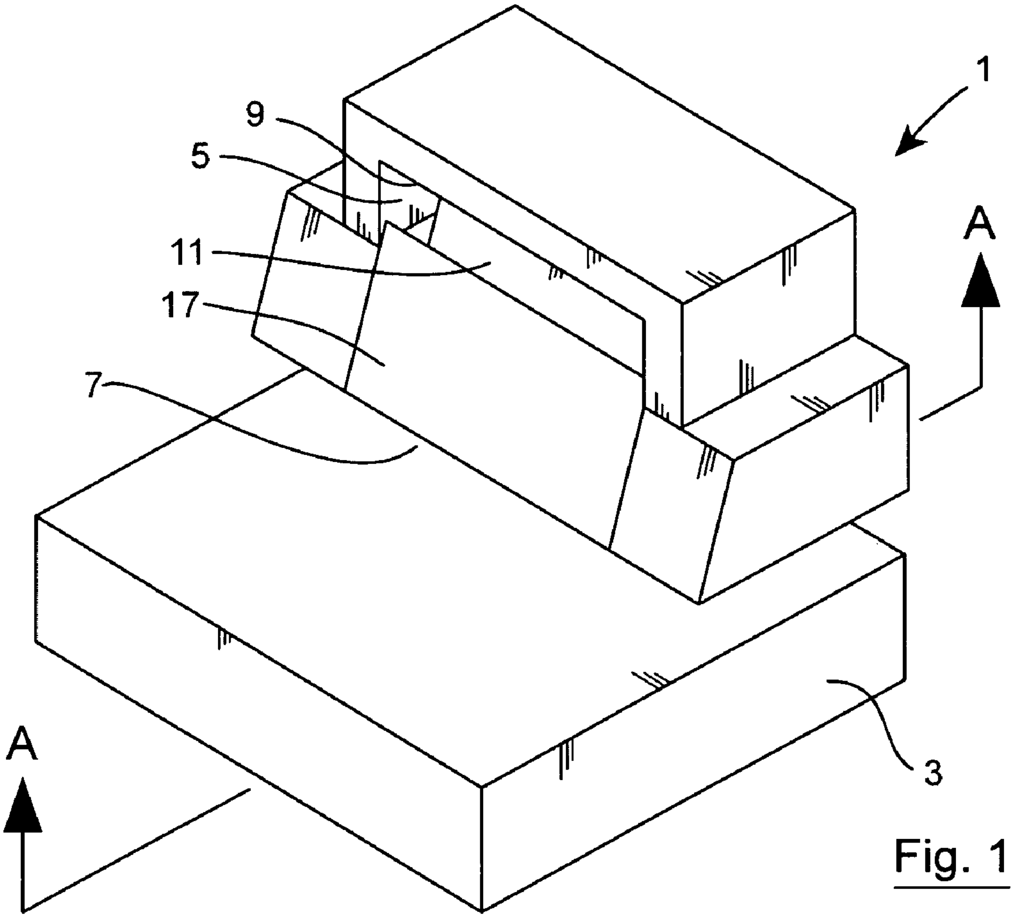
FIG. 1 is a perspective view of a temporary plaque manufacturing apparatus according to the present invention.
Figure 2:
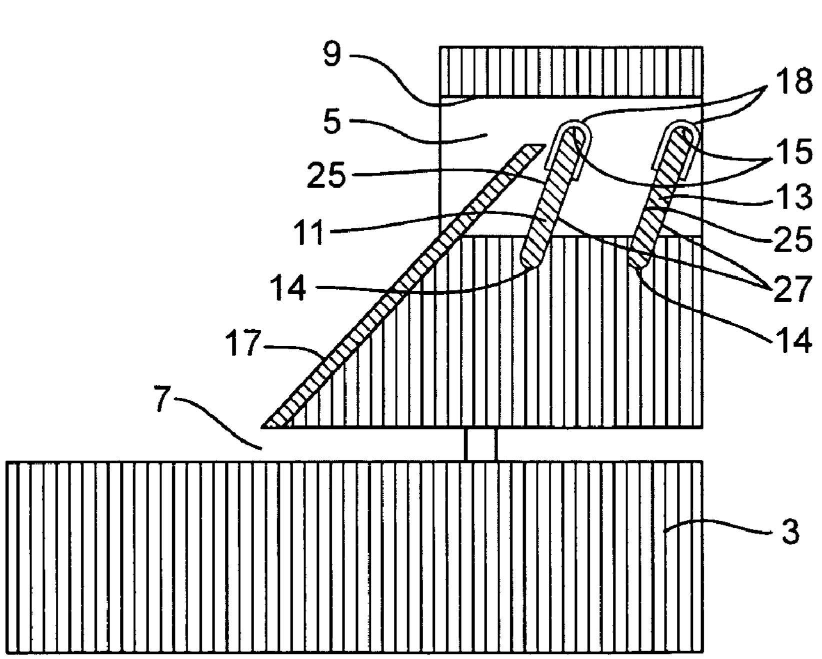
FIG. 2 is a cross sectional view of the apparatus of FIG. 1 along the lines A-A FIGS. 3(*a*)-3(*f*) inclusive are cross sectional views of the apparatus of FIG. 1 along the lines A-A showing sequentially the steps of applying a flexible sheet to a mounting plate to produce a temporary plaque.
Figure 3B:
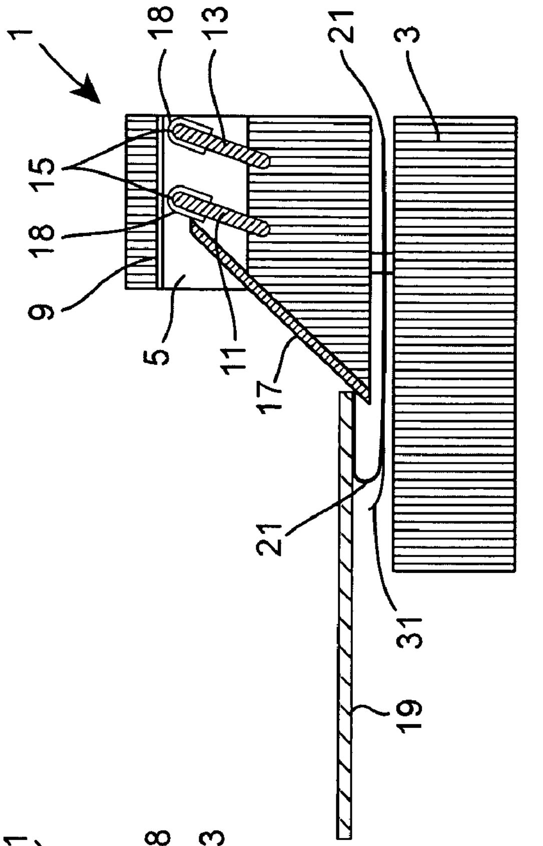
Figure 3A:
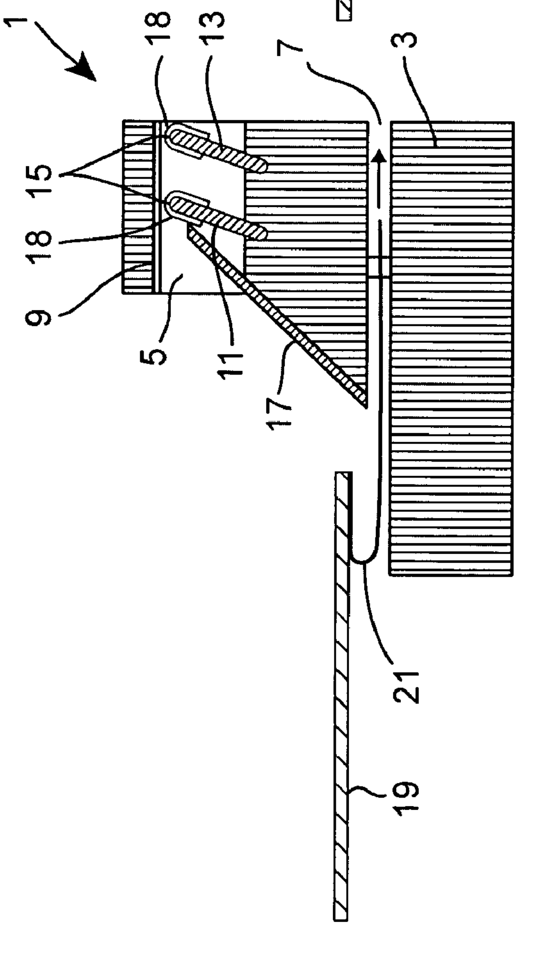
Figure 3D:
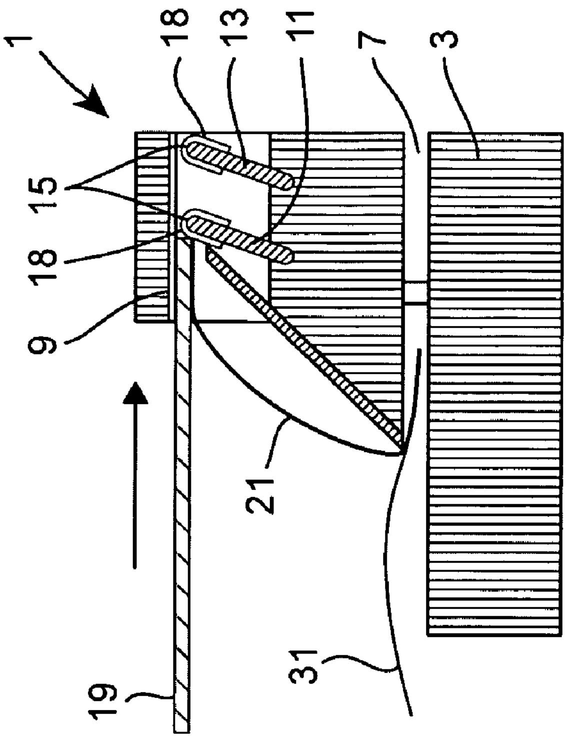
Figure 3C:
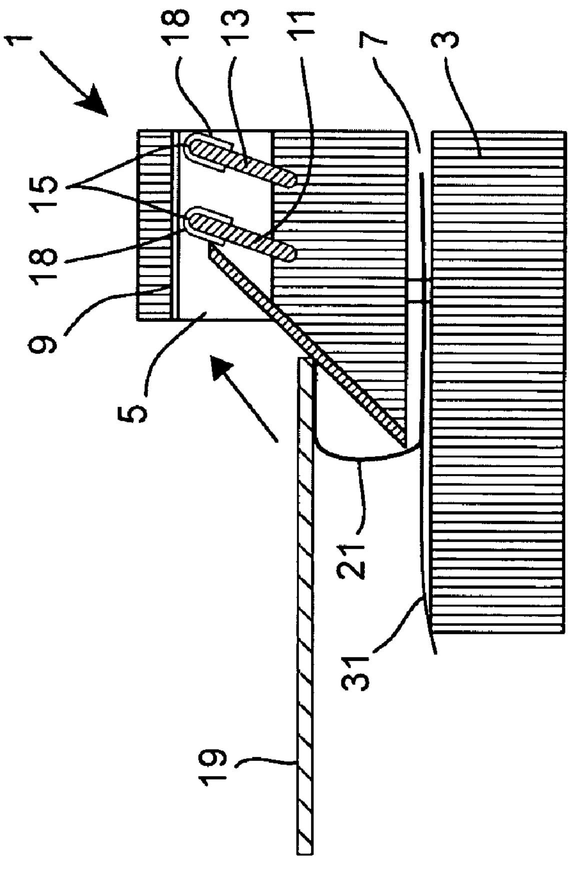
Figure 3F:
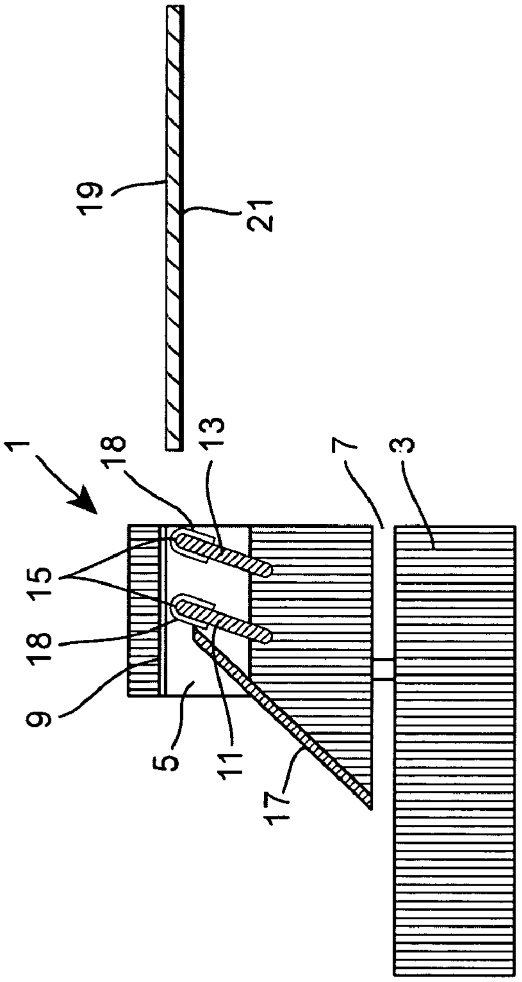
Figure 3E:
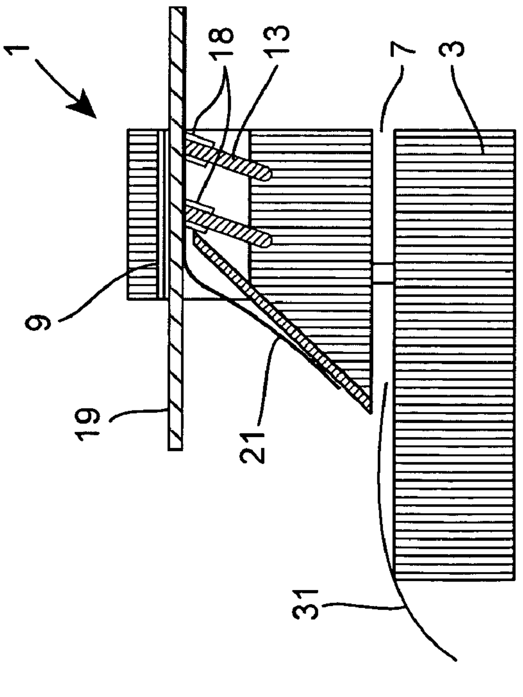

Referring to FIGS. 1 and 2 of the drawings, there is shown a temporary plaque manufacturing apparatus, indicated generally by the reference numeral 1 comprising a plaque support frame 3 having a plaque receiving slot 5 and a flexible sheet receiving slot 7. A top face of the plaque receiving slot 5 forms a plaque support surface 9 while mounted on the opposing surface 10 of the plaque receiving slot 5 there is mounted a pair of elongated flaps 11, 13. One edge 14 of the flaps is mounted on the plaque support frame 3 while the other edge 15 of the flaps lies adjacent to plaque support surface 9.

The plaque receiving slot 5 and flexible sheet receiving slot 7 are vertically spaced from each other and offset in a front and back direction with respect to each other. There is further provided an inclined guide surface 17 therebetween for guiding a mounting plate (not shown) and flexible sheet (not shown) towards the plaque receiving slot 5. The flaps 11, 13 and the plaque support surface 9 cooperate so when a mounting plate and a flexible sheet are passed therebetween, the flaps 11, 13 act on one of the flexible sheet and the mounting plate while the plaque support surface 9 acts on the other of the flexible sheet and the mounting plate to bring the flexible sheet and the mounting plate into engagement with each other and secure them together.

Referring now specifically to FIG. 2, each of the elongated flaps 11, 13 is provided with a wear resistant cover 18 extending upwardly along a forward facing surface 25 of the elongate flap, over the edge 15 of the elongated flap located adjacent to the plaque support surface 9 and downwardly along a rearward facing surface 27 of the elongate flap 11, 13. The wear resistant cover 18 extends upwardly along the forward facing surface 25 of the elongate flap 11, 13 by a distance of 0.005 meters (0.5 mm) and extends downwardly along a rearward facing surface of the elongate flap by a distance of 0.005 meters (0.5 mm). The wear resistant cover is constructed from a reinforced vinyl material, in this case polyester vinyl.

Referring to FIGS. 3(*a*) to 3(*f*) inclusive there is shown a cross sectional view of the sequential steps taken manufacturing a temporary plaque using the apparatus according to the present invention. Before introducing a flexible sheet 21 and a mounting plate 19 to the apparatus, indicia such as name and information concerning the deceased, in the case of a temporary plaque for a coffin, are printed onto the flexible sheet using a printer, fax machine or other printing device. The flexible sheet having the indicia printed thereon is then taken and a part of the flexible sheet which has adhesive thereon is exposed by peeling away part of a backing strip 31. Preferably, the backing strip will have been pre-scored to allow a portion of the backing strip to be removed cleanly. The exposed part of the flexible sheet is aligned carefully with the edge of the mounting plate 19. The remainder of the flexible sheet is then bent back upon itself into the position where the flexible sheet and the mounting plate are substantially in line with each other as shown in FIG. 3(*a*).

The flexible sheet is inserted into slot 7 as far as possible until the mounting plate 19 comes into contact with the inclined surface 17 (FIG. 3(*b*)). The mounting plate 19 is then gradually slid upwards along the inclined surface 17 towards the plaque receiving slot 5 and the elongate flaps 11, 13 located therein (FIG. 3(*c*)) until the mounting plate and the flexible sheet abut against the plaque support surface 9 and the resiliently deformable flap 11 respectively (FIG. 3(*d*)). As the mounting plate and the flexible sheet rise gradually up the inclined surface 17 the backing strip 31 gradually peels off from the side of the flexible sheet having the adhesive thereon. The mounting plate and the flexible sheet are pushed against the flap 11 which deforms while at the same time maintaining pressure against the flexible material and pressing it against the mounting plate (FIG. 3(*e*)). Finally, at FIG. 3(*f*) the mounting plate and the flexible sheet are pulled completely through the plaque receiving slot 5 with the mounting plate and the flexible sheet in engagement thereby forming the temporary plaque.

The temporary plaque manufactured in such a manner has no air bubbles between the mounting plate and the flexible sheet thereby enhancing the appearance and the perceived value of the plaque. The elongate flaps 11, 13 are resiliently deformable and therefore provide the biasing means to press the mounting plate and flexible sheet together. The gap between the edge 15 of the elongate flaps 11, 13 and the plaque mounting surface 9 is less than the thickness of the mounting plate and therefore as the mounting plate is pushed through the plaque receiving slot 5, the resiliently deformable flaps 11, 13 are pushed downwardly and rearwardly but they maintain contact with the plaque via the flexible sheet. It can be seen therefore that how, over time, the edges 15 of the flaps 11, 13 are subjected to significant wear and without the protective wear resistant cover, will become worn down thereby reducing the effectiveness of the temporary plaque manufacturing device.

Figure 4:
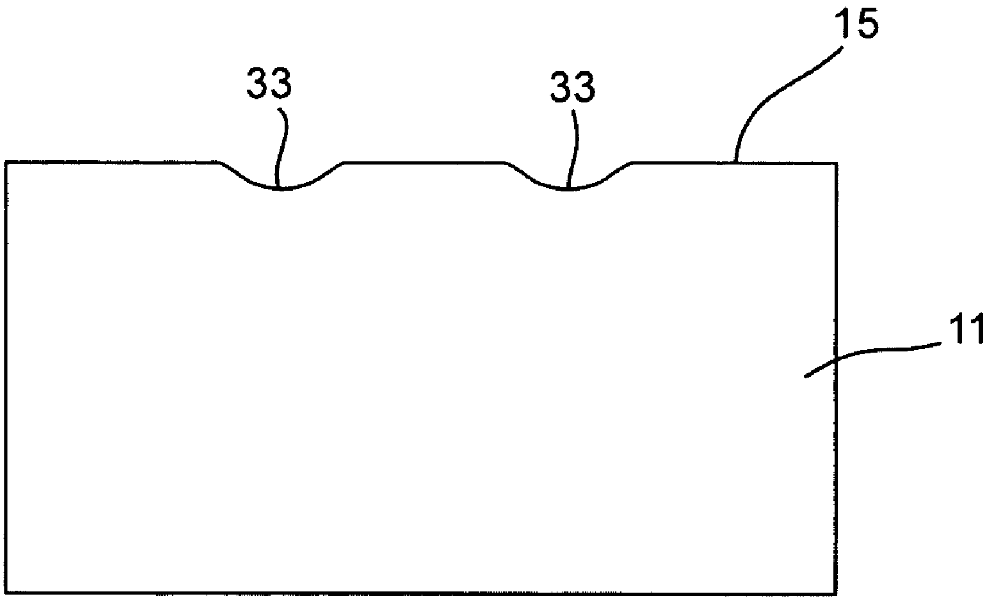
FIG. 4 is a front view of an elongated flap without a wear resistant cover that has been in use with the temporary plaque manufacturing device.

Referring to FIG. 4 of the drawings there is shown an elongate flap without a wear resistant cover mounted thereon. Over time, the upper edge 15 of the flap 11 will become worn down. Furthermore, grooves 33 will form in the edge 15 of the flap 11 when smaller mounting plates (not shown) are pushed through the temporary plaque manufacturing apparatus. The mounting plates typically have an upstanding rim around the perimeter thereof which, over time, will cause a groove to be formed in the edge 15.

Figure 5:
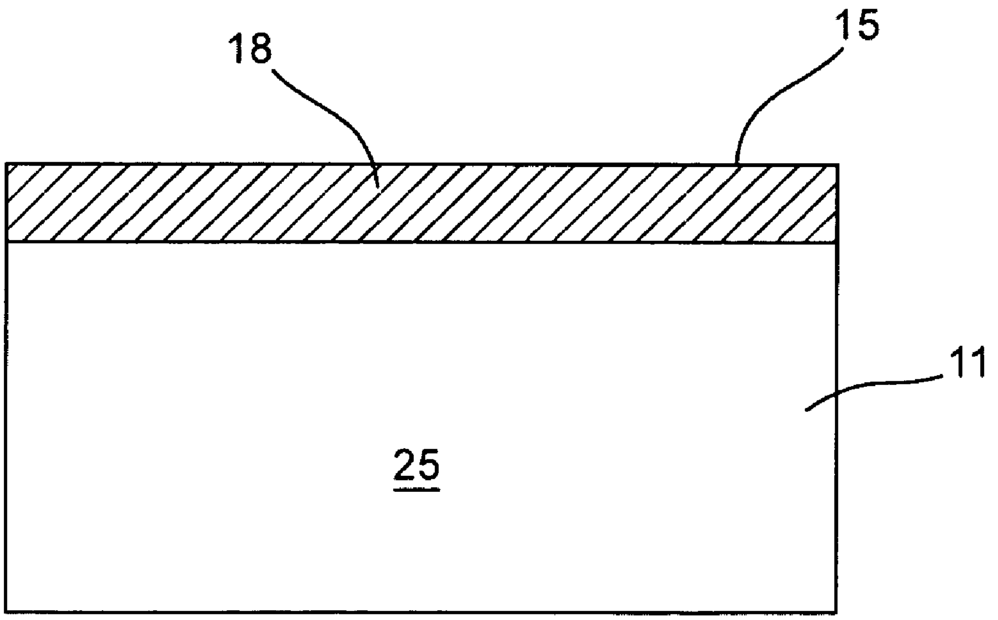
FIG. 5 is an elongated flap with a wear resistant cover mounted thereon that has been in use with the temporary plaque manufacturing device.

Referring to FIG. 5, there is shown an elongate flap 11 for a temporary plaque manufacturing apparatus with a wear resistant cover 18 mounted thereon. The wear resistant cover 18 is manufactured from a reinforced vinyl material, in this case a polyester vinyl. A polyester vinyl is a polyester weave coated with vinyl which is resistant to wear. The wear resistant cover extends upwardly along the front face 25 of the elongate flap 11 by a distance of 0.005 meters and extends over the edge 15 located adjacent to the plaque support surface (not shown) and extends downwardly along a rearward facing surface (not shown) of the elongate flap 11 by a distance of no less than 0.005 meters. The wear resistant cover extends along the entire length of the elongate flap 11. It is envisaged that a number of wear resistant covers may be mounted in layers, one on top of the other, on the elongate flap 11.

Figure 6:
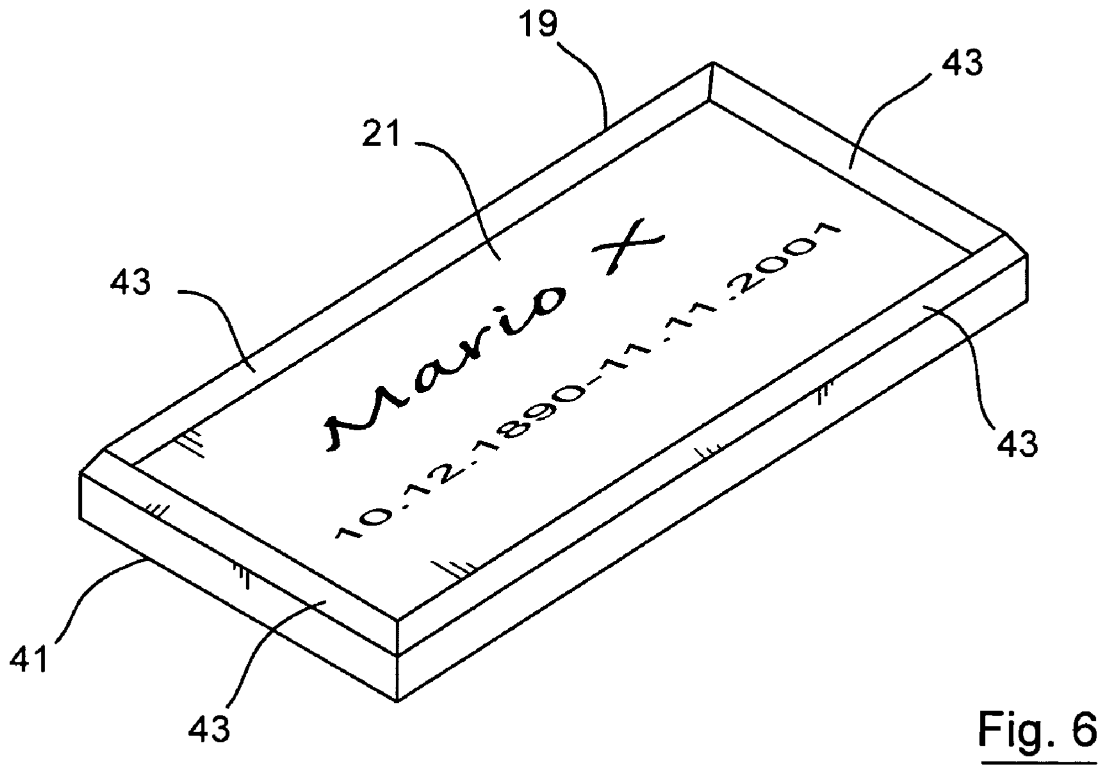
FIG. 6 is a perspective view of a mounting plate forming part of a temporary plaque.

Referring to FIG. 6 of the drawings, there is shown a temporary plaque constructed using the apparatus according to the present invention. The temporary plaque comprises a mounting plate 19 and a flexible sheet 21 connected thereto. The mounting plate 19 comprises a substantially rectangular shaped body 41 with an upstanding rim 43 around the periphery thereof. The flexible sheet 21 with indicia printed thereon is placed on the mounting plate 19.

Figure 7:
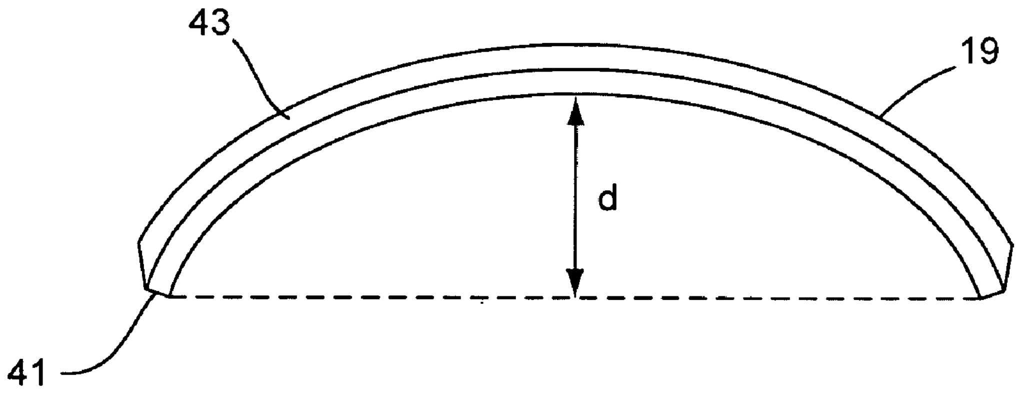
FIG. 7 is a side view of the mounting plate shown in FIG. 6 bent intermediate its ends.

Referring to FIG. 7 of the drawings, there is shown a side view of the mounting plate 19 of FIG. 6 in a bent configuration. The mounting plate 19 may be bent to take on an arcuate shape and therefore may be applied to curved objects such as an urn or the like (not shown). The mounting plate 19 is deformable and may be bent to a maximum depth of curvature, d, of the order of at least 20% of the length of the mounting plate. In other words the mounting plate may be bent intermediate its ends so that for a 10 cm long mounting plate, the centre of the plate will have a depth of curvature, d, of 2 cm. The mounting plate has a maximum thickness of between 0.002 (2 mm) and 0.0002 meters (0.2 mm). The curved mounting plate 19 may then be affixed to an urn or like device using an adhesive or cementitious material.

The is seen as particularly advantageous as previously, an engraved plaque had to be hung by a chain around the urn or a thin bendable foil had to be engraved before being affixed to the urn which was difficult and time consuming to do. Using an appropriate plaque, the temporary plaque manufacturing apparatus may be used to apply temporary plaques to urns and the like thereby reducing the cost and complexity of supplying a temporary plaque for an urn.

The wear resistant cover is preferably formed from a ruggedised vinyl material. The ruggedised vinyl is particularly preferred as it is inexpensive and can be mounted on the vinyl flap in a relatively simple manner. The ruggedised vinyl material may be a polyester vinyl or what is referred to in the materials industry as a reflective vinyl that are not prone to wear and tear. Preferably, the vinyl will have an adhesive coating on one side to facilitate application to the flap. Alternatively, the wear resistant cover could be provided by another material that may be mounted over the edge of the flap and connected thereto that is less prone to wear than the vinyl flap. Essentially, the material used for the wear resistant cover must be of a tougher composition, or in other words have greater shore hardness, than the flap itself to be more durable than the flap and it does not require the flexibility of the vinyl flap. Therefore, it is envisaged that the wear resistant cover could be provided by a plastics material moulded into a shape that corresponds to the edge of the flap or a metallic cover bent to fit the shape of the edge of the flap.

In this specification the terms "comprised, comprises, comprise and comprising" and the terms "include, includes, included and including" are deemed totally interchangeable and should be afforded the widest possible interpretation.

The invention is in no way limited to the embodiments herein and before described but may be varied in both construction and detail within the scope of the claims.

What is claimed is:

1. A temporary plaque manufacturing apparatus, the temporary plaque comprising a two part plaque, one part being a mounting plate and the other part being a flexible sheet, the flexible sheet having indicia on a first surface thereof and an adhesive coating on a second surface thereof for affixing the flexible sheet onto a front face of the mounting plate, the temporary plaque manufacturing apparatus comprising a plaque support frame having a plaque receiving slot and a flexible sheet receiving slot, the flexible sheet receiving slot being dimensioned to receive a free end of the flexible sheet and gradually release the flexible sheet therefrom as the flexible sheet and the mounting plate are passed through the plaque receiving slot;

the plaque receiving slot having a plaque support surface and an elongate flap housed therein and located on opposite sides thereof, the plaque receiving slot further comprising a biasing means urging the flap towards the plaque support surface, the plaque support surface being for engagement of one of the mounting plate and the flexible sheet and the elongate flap being for engagement of the other of the mounting plate and the flexible sheet so that on the mounting plate and the flexible sheet being passed between the plaque support surface and the elongate flap, the flexible sheet is brought into engagement with the mounting plate and secured thereto;

the elongate flap further comprising a first elongate edge about which the flap is mounted on the plaque support frame and a second elongate edge located adjacent to the plaque support surface, the elongate flap having a wear resistant cover mounted thereon, the wear resistant cover extending upwardly along a forward facing surface of the elongate flap, over the edge located adjacent to the plaque support surface and downwardly along a rearward facing surface of the elongate flap.

2. The temporary plaque manufacturing apparatus as claimed in claim 1 in which the wear resistant cover extends upwardly along the forward facing surface of the elongate flap by a distance no less than 0.005 meters.

3. The temporary plaque manufacturing apparatus as claimed in claim 2 in which the wear resistant cover extends downwardly along a rearward facing surface of the elongate flap by a distance no less than 0.005 meters.

4. The temporary plaque manufacturing apparatus as claimed in claim 1 in which the wear resistant cover comprises a reinforced vinyl material.

5. The temporary plaque manufacturing apparatus as claimed in claim 4 in which the wear resistant cover comprises polyester vinyl.

6. The temporary plaque manufacturing apparatus as claimed in claim 4 in which the wear resistant cover extends upwardly along the forward facing surface of the elongate flap by a distance no less than 0.005 meters.

7. The temporary plaque manufacturing apparatus as claimed in claim 6 in which the wear resistant cover extends downwardly along a rearward facing surface of the elongate flap by a distance no less than 0.005 meters.

8. The temporary plaque manufacturing apparatus as claimed in claim 1 in which the wear resistant cover extends across the temporary plaque manufacturing apparatus along the entire length of the elongate flap.

9. The temporary plaque manufacturing apparatus as claimed in claim 8 in which the wear resistant cover extends upwardly along the forward facing surface of the elongate flap by a distance no less than 0.005 meters.

10. The temporary plaque manufacturing apparatus as claimed in claim 9 in which the wear resistant cover comprises a reinforced vinyl material.

11. The temporary plaque manufacturing apparatus as claimed in claim 1 in which there are provided a plurality of wear resistant covers mounted in layers, one on top of the other, on the elongate flap.

12. The temporary plaque manufacturing apparatus as claimed in claim 1 in which the mounting plate is deformable and may be bent intermediate its ends to a depth of curvature of the order of at least 20% of the length of the mounting plate.

13. The temporary plaque manufacturing apparatus as claimed in claim 12 in which the mounting plate has a maximum thickness of between 0.002 meters and 0.0002 meters.

14. The temporary plaque manufacturing apparatus as claimed in claim 1 in which the wear resistant cover is constructed from a material having a greater durability than the flap.

15. A temporary plaque manufacturing apparatus, the temporary plaque comprising a two part plaque, one part being a mounting plate and the other part being a flexible sheet, the flexible sheet having indicia on a first surface thereof and an adhesive coating on a second surface thereof for affixing the flexible sheet onto a front face of the mounting plate, the temporary plaque manufacturing apparatus comprising a plaque support frame having a plaque receiving slot and a flexible sheet receiving slot, the flexible sheet receiving slot being dimensioned to receive a free end of the flexible sheet and gradually release the flexible sheet therefrom as the flexible sheet and the mounting plate are passed through the plaque receiving slot;

the plaque receiving slot having a plaque support surface and an elongate flap housed therein and located on opposite sides thereof, the plaque receiving slot further comprising a biasing means urging the flap towards the plaque support surface, the plaque support surface being for engagement of one of the mounting plate and the flexible sheet and the elongate flap being for engagement of the other of the mounting plate and the flexible sheet so that on the mounting plate and the flexible sheet being passed between the plaque support surface and the elongate flap, the flexible sheet is brought into engagement with the mounting plate and secured thereto;

the elongate flap further comprising a first elongate edge about which the flap is mounted on the plaque support frame and a second elongate edge located adjacent to the plaque support surface, the elongate flap having a wear resistant cover mounted thereon, the wear resistant cover extending upwardly by a distance no less than 0.005 meters along a forward facing surface of the elongate flap, over the edge located adjacent to the plaque support surface and downwardly by a distance no less than 0.005 meters along a rearward facing surface of the elongate flap.

16. The temporary plaque manufacturing apparatus as claimed in claim 15 in which the wear resistant cover comprises a reinforced vinyl material.

17. The temporary plaque manufacturing apparatus as claimed in claim 16 in which the wear resistant cover comprises polyester vinyl.

18. A temporary plaque manufacturing apparatus, the temporary plaque comprising a two part plaque, one part being a mounting plate and the other part being a flexible sheet, the flexible sheet having indicia on a first surface thereof and an adhesive coating on a second surface thereof for affixing the flexible sheet onto a front face of the mounting plate, the temporary plaque manufacturing apparatus comprising a plaque support frame having a plaque receiving slot and a flexible sheet receiving slot, the flexible sheet receiving slot being dimensioned to receive a free end of the flexible sheet and gradually release the flexible sheet therefrom as the flexible sheet and the mounting plate are passed through the plaque receiving slot;

the plaque receiving slot having a plaque support surface and an elongate flap housed therein and located on opposite sides thereof, the plaque receiving slot further comprising a biasing means urging the flap towards the plaque support surface, the plaque support surface being for engagement of one of the mounting plate and the flexible sheet and the elongate flap being for engagement of the other of the mounting plate and the flexible sheet so that on the mounting plate and the flexible sheet being passed between the plaque support surface and the elongate flap, the flexible sheet is brought into engagement with the mounting plate and secured thereto;

the elongate flap further comprising a first elongate edge about which the flap is mounted on the plaque support frame and a second elongate edge located adjacent to the plaque support surface, the elongate flap having a wear resistant cover mounted thereon, the wear resistant cover comprises a reinforced vinyl material extending upwardly along a forward facing surface of the elongate flap, over the edge located adjacent to the plaque support surface and downwardly along a rearward facing surface of the elongate flap.

19. The temporary plaque manufacturing apparatus as claimed in claim 18 in which the wear resistant cover comprises polyester vinyl.

20. The temporary plaque manufacturing apparatus as claimed in claim 18 in which the wear resistant cover extends upwardly along the forward facing surface of the elongate flap by a distance no less than 0.005 meters.

* * * * *